United States Patent
Brethereau et al.

(10) Patent No.: US 8,081,607 B2
(45) Date of Patent: Dec. 20, 2011

(54) METHOD AND SYSTEM FOR OPERATING A MOBILE COMMUNICATION NETWORK

(75) Inventors: Alain Brethereau, Viroflay (FR);
Béatrix De Mathan, Paris (FR);
Jean-Roch Houllier, Saint-Michel sur Orge (FR); Eric Brigant,
Velizy-Villacoublay (FR); Antoine Landrault, Rambouillet (FR)

(73) Assignee: Alcatel Lucent, Paris (FR)

( * ) Notice: Subject to any disclaimer, the term of this patent is extended or adjusted under 35 U.S.C. 154(b) by 313 days.

(21) Appl. No.: 11/319,712

(22) Filed: Dec. 29, 2005

(65) Prior Publication Data
US 2006/0148466 A1    Jul. 6, 2006

(30) Foreign Application Priority Data
Dec. 31, 2004 (FR) ..................... 04 53275

(51) Int. Cl.
*H04W 4/00* (2009.01)
*H04W 24/00* (2009.01)

(52) U.S. Cl. ............... 370/338; 455/422.1; 455/423; 455/424

(58) Field of Classification Search .............. 370/328, 370/338; 455/422.1, 423, 424
See application file for complete search history.

(56) References Cited

U.S. PATENT DOCUMENTS
2003/0139141 A1* 7/2003 Marjamaki et al. ........ 455/67.1
2004/0117226 A1* 6/2004 Laiho et al. ................ 705/7

FOREIGN PATENT DOCUMENTS
EP    1 351 532 A1    10/2003
WO    WO 03/037019    * 5/2003

OTHER PUBLICATIONS

Beatrix de Cambray-de Mathan et al, "L"Optimisation des Reseaux Cellulaires Assistee par Ordinateur: Le Logiciel RNO (Radio Network Optimisation) Computer-Aided Optimization of Cellular Networks : The RNO (Radio Network Optimisation) Software—Annals des Telecommunications, Presses Polytechniques et Universitaires Romandes< Lausanne, CH, vol. 58 No. 7/8 Jul. 2003, pp. 946-1000, XP001186072.

* cited by examiner

*Primary Examiner* — Michael Thier
(74) *Attorney, Agent, or Firm* — Sughrue Mion, PLLC

(57) ABSTRACT

A method of operating a mobile communication network includes defining at least one criterion of inclusion of network objects in at least one group of network objects also referred to as an object zone, constructing at least one object zone from network objects satisfying said at least one criterion and performing at least one radio network optimization operation using said at least one object zone constructed in this way.

14 Claims, 4 Drawing Sheets

FIG_1
PRIOR ART
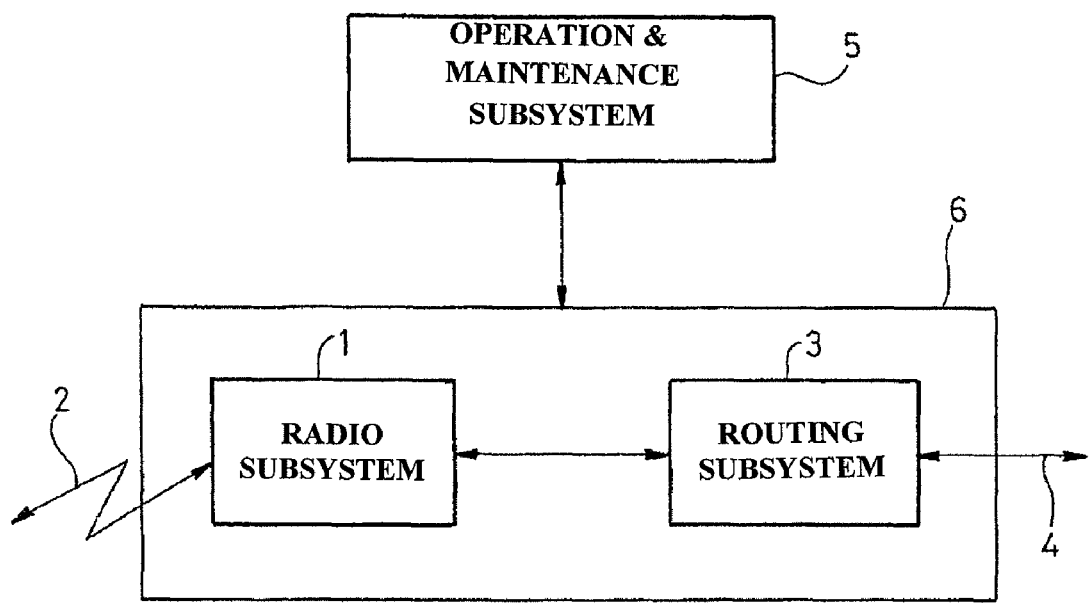

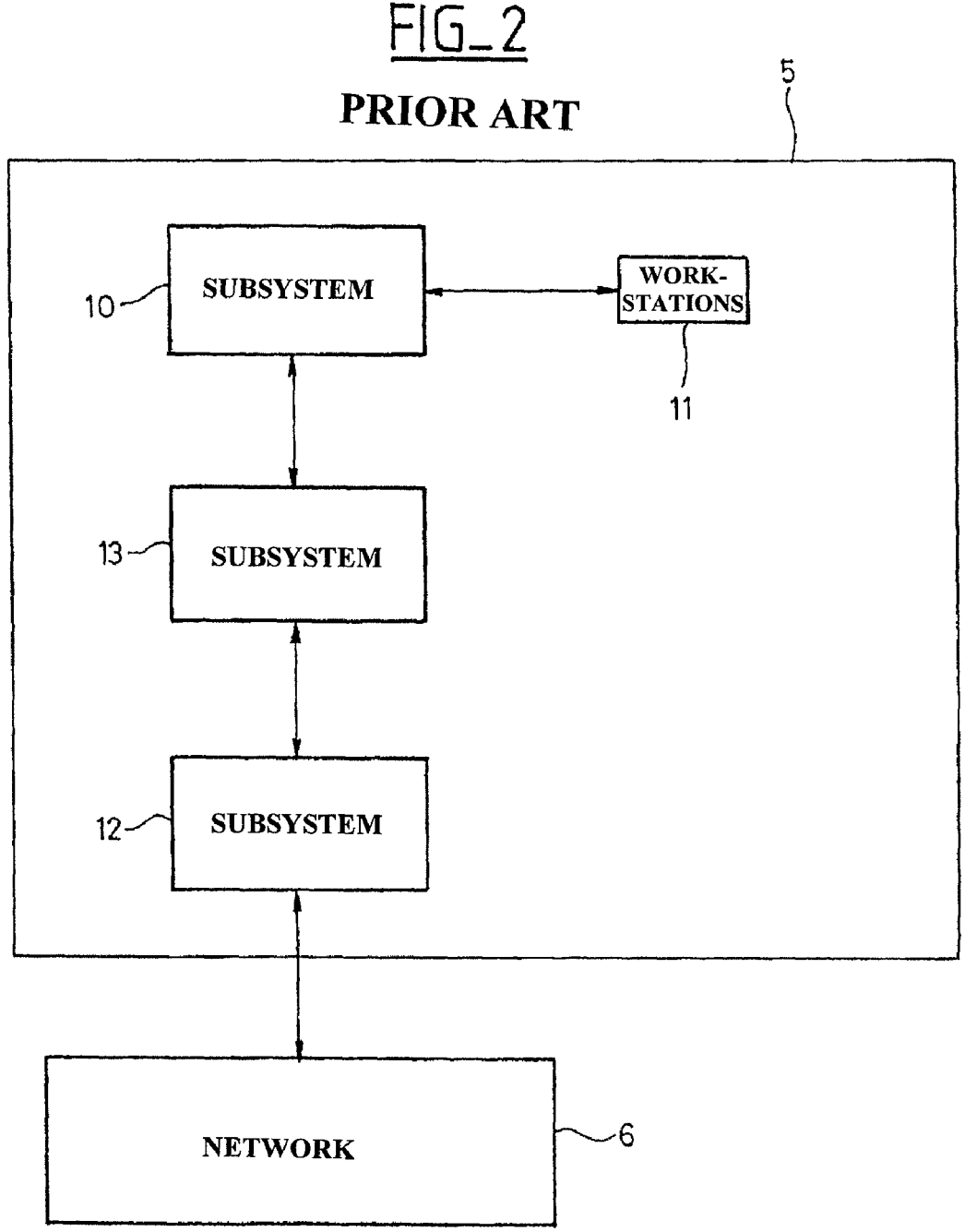

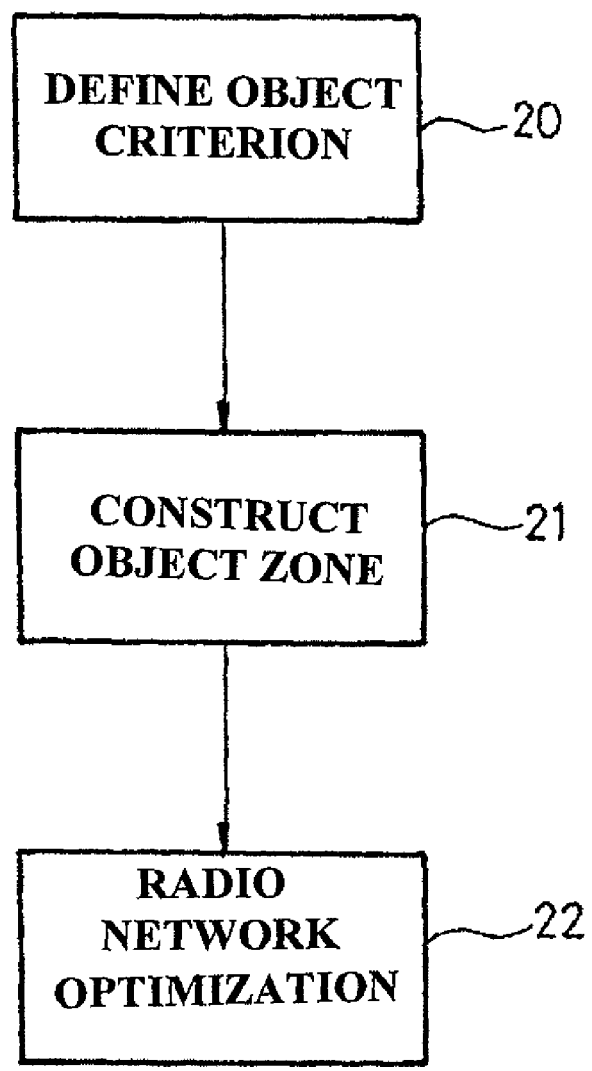

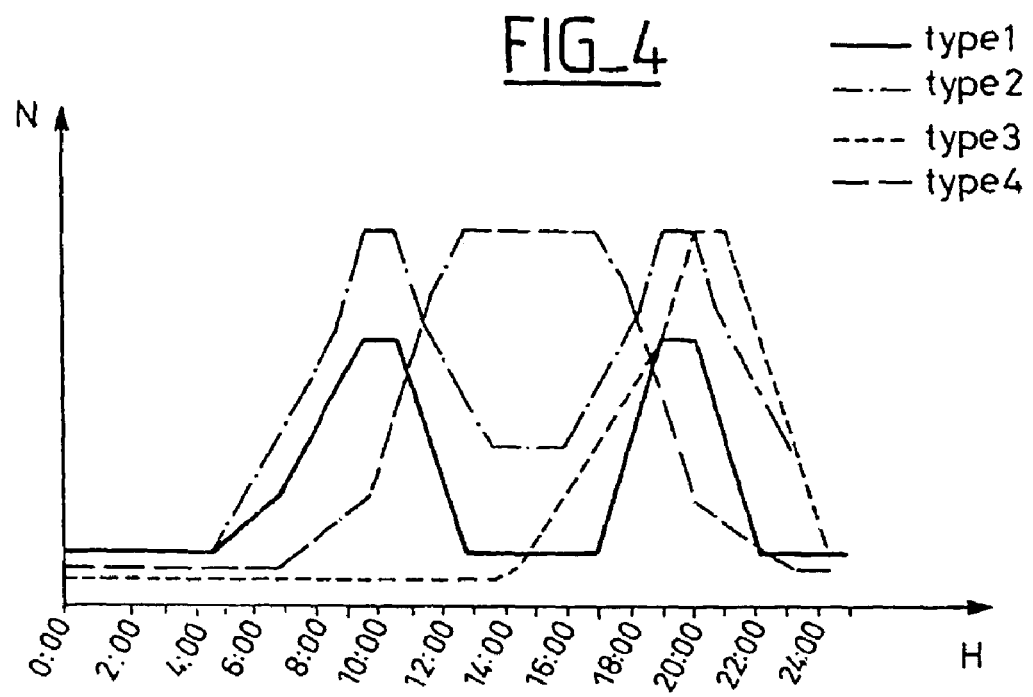
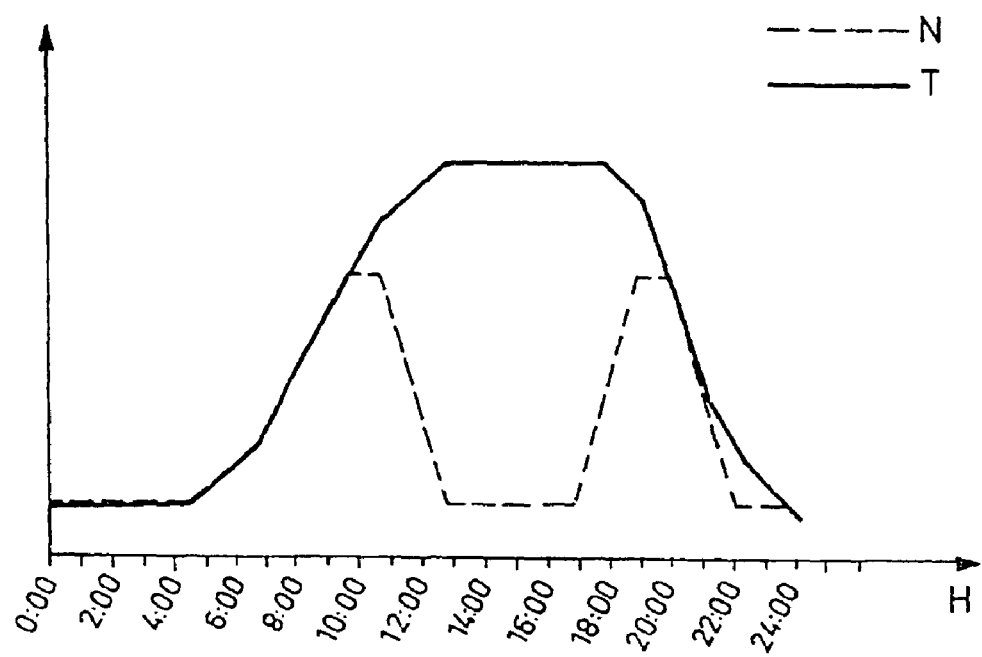

US 8,081,607 B2

METHOD AND SYSTEM FOR OPERATING A MOBILE COMMUNICATION NETWORK

CROSS-REFERENCE TO RELATED APPLICATIONS

This application is based on French Patent Application No. 0453275 filed Dec. 31, 2004, the disclosure of which is hereby incorporated by reference thereto in its entirety, and the priority of which is hereby claimed under 35 U.S.C. §119.

BACKGROUND OF THE INVENTION

1. Field of the Invention

The present invention relates generally to mobile communication systems.

Mobile communication systems are generally covered by standards and the corresponding standards published by the corresponding standards organizations may be consulted for more information.

2. Description of the Prior Art

Suffice to say that, as shown in FIG. 1, a mobile communication system comprises three subsystems:

- a radio subsystem 1, also called the "radio network", that is essentially responsible for functions of transmission over the radio interface (2) and for management of radio resources, the radio subsystem being also called the base station subsystem (BSS) in systems such as the Global System for Mobile communications (GSM) in particular or the radio network subsystem (RNS) in systems such as the Universal Mobile Telecommunications System (UMTS) in particular, and the radio subsystem itself comprising network elements such as base stations (a base station is called a base transceiver station (BTS) in systems such as the GSM or a Node B in systems such as the UMTS) or base station controllers (BSC), as they are known in systems such as the GSM, being also called radio network controllers (RNC) in systems such as the UMTS,
- a routing subsystem 3, also called the "fixed network" or "network subsystem" (NSS), that is essentially responsible for call set-up and mobility management functions, this routing subsystem being connected firstly to the radio subsystem and also (as indicated at 4) to external networks (not specifically shown), and
- an operation and maintenance system 5, also called the "operation subsystem" (OSS), essentially enabling the operator to manage his network 6, which is formed of the radio network 1 and the fixed network 3.

Network operation encompasses various tasks, a particularly important one of which is optimizing the radio network. Generally speaking, the objective of this radio network optimization task for the operator (also referred to hereinafter as the optimizer or user) is to achieve the required quality of service by using the available radio resources as efficiently as possible.

Optimizing the radio network itself encompasses various functions, in particular functions for diagnosing network problems and/or analyzing quality of service and for optimizing the radio parameter settings on the basis of such diagnoses and/or analyses.

Furthermore, a mobile communication network operating system may itself comprise three subsystems, as shown in FIG. 2:

- a subsystem 10 that is essentially responsible for processing tasks corresponding to the implementation of the various operating tasks and communicates with the operator via workstations 11,
- a subsystem 12 that is essentially responsible for applying to the network 6 commands coming from the subsystem 10 and for receiving from the network 6 data needed for the processing carried by the subsystem 10, and
- a subsystem 13 handling the functions that provide communication between the subsystems 10 and 12.

Generally speaking, the growth in the traffic to be managed, and the consequentially ever increasing number of network elements installed and therefore of parameters to be processed, not to mention the variety and the complexity of the heterogeneous information to be analyzed (whether it comes from the network itself or from its geographical environment), make the optimization tasks extremely complex, and it then becomes important to simplify and/or facilitate the work of the operator. The present invention addresses these requirements in particular.

SUMMARY OF THE INVENTION

One aspect of the present invention is method of operating a mobile communication network, said method including steps of:

defining at least one criterion of inclusion of network objects in at least one group of network objects, said group also being referred to as an object zone, constructing at least one object zone from network objects satisfying said at least one criterion, and performing at least one radio network optimization operation using said at least one object zone constructed in this way.

Another aspect of the present invention is an operating system for a mobile communication network, said system comprising:

means for defining at least one criterion of inclusion of network objects in at least one group of network objects, said group also being referred to as an object zone, means for constructing at least one object zone from network objects satisfying said at least one criterion, and means for performing at least one radio network optimization operation using said at least one object zone constructed in this way.

A further aspect of the present invention is a workstation for operating a mobile communication network, said workstation comprising means enabling the user to define at least one criterion of inclusion of network objects in at least one group of network objects, said group being also referred to as an object zone.

A further aspect of the present invention is a workstation for operating a mobile communication network, said workstation comprising means enabling the user to perform at least one radio network optimization operation using a group of network objects satisfying at least one criterion of inclusion of network objects in at least one group of network objects, said group also being referred to as an object zone.

Other objects and features of the present invention will become apparent on reading the following description with reference to the appended drawings of one embodiment of the invention.

BRIEF DESCRIPTION OF THE DRAWINGS

FIG. 1 outlines the general architecture of a cellular mobile communication system.

FIG. 2 outlines the general architecture of a cellular mobile communication network operating system.

FIG. 3 shows the steps of a method conforming to one aspect of the invention.

FIGS. 4 and 5 show various types of movement that may be studied by the method constituting one aspect of the invention using a particular example of object zones corresponding to adjacency zones.

DETAILED DESCRIPTION OF THE PREFERRED EMBODIMENT

One aspect of the present invention is a mobile communication network operating method including, as shown in FIG. 3:

a step 20 of defining at least one criterion of inclusion of network objects in at least one group of network objects, said group being also referred to as an object zone, a step 21 of constructing at least one object zone from network objects satisfying said at least one criterion, and a step 22 of carrying out at least one radio network optimization operation using said at least one object zone constructed in this way.

The present invention is applicable to all types of network object that can be manipulated or managed in the context of radio network optimization operations, whether they be logical objects (for example cells, radio or cable links, etc.) or physical objects (for example network elements, sets of network elements, etc.).

Various criteria of inclusion of network objects in an object zone may be defined. Combinations of criteria may also be used.

An object zone is constructed from network objects satisfying the criterion or criteria concerned. In other words, the network objects satisfying that criterion or those criteria are selected to constitute an object zone.

Examples of criteria include:
criteria based on radio configuration parameters,
criteria based on quality of service indicators,
criteria based on network topology parameters,
criteria based on cell characteristics,
criteria based on parameters of adjacency relationships between cells,
geomarketing criteria,
geographical criteria,
time criteria, etc.

The radio configuration parameters may be logical parameters (for example access control parameters, power control parameters, handover (intercellular transfer) control parameters, etc.) or physical parameters (for example base station transmit power parameters, etc.).

Examples of the selection of network objects satisfying a criterion based on radio configuration parameters include selecting all cells for which an access control parameter is greater than or less than a given threshold value; for example, all cells could be selected for which the parameter RX_LEV_ACCESS_MIN (defined in the GSM standard) is greater than or equal to 200.

The quality of service indicators, which can be consolidated spatially and/or temporally, are generally calculated from performance data collected at various nodes of the network. One example of a quality of service indicator is the call drop rate, which may be tracked daily (or at any other period) and cell by cell (or for any other network object), for example.

Examples of the selection of network objects satisfying a criterion based on quality of service indicators include selecting all BSCs and RNCs for which the call drop rate is greater than 3%.

The network topology parameters include parameters such as location area configuration parameters, for example, such as in particular the location area code (LAC) parameter defined in the GSM standard.

Examples of the selection of network objects satisfying a criterion based on network topology parameters include selecting all cells included in a given location area (identified by a given value of the parameter LAC).

The parameters of an adjacency relationship between cells include in particular, for each cell, a list of the cells called the adjacent cells. Generally speaking, in these systems, change of cell mechanisms are provided to enable a connection to be maintained when a mobile station moves from an area covered by one cell to an area covered by another cell. A decision to change cell is based in particular on results of radio measurements effected in cells adjacent a current serving cell. A list of adjacent cells is defined in this way for each cell and is generally communicated to the mobile stations via the radio network.

Examples of the selection of network objects satisfying a criterion based on parameters of the adjacency relationship between cells include selecting all the RNCs that manage at least one cell that is in a list of adjacent cells drawn up for a given cell (identified by a given cell identifier).

The characteristics of a cell generally include:
the class: for example urban, dense urban, rural, suburban, indoor, etc.,
the type: for example microcell, macrocell, etc.,
the frequency spectrum: for example 900 MHz, 1800 MHz, etc.,
the radio access technology: for example Global System for Mobile communications (GSM), General Packet Radio Service (GPRS), Enhanced Data rates for GSM Evolution (EDGE), Universal Mobile Telecommunications System (UMTS), etc.

Examples of the selection of network objects satisfying a criterion based on cell characteristics include selecting all GSM microcells or all cells whose frequency spectrum corresponds to 900 MHz.

Examples of the selection of network objects satisfying a geomarketing criterion include selecting all the cells corresponding to an area of activity, for example a business area, a commercial center, etc.

Examples of the selection of network objects satisfying a geographical criterion include selecting all the cells through which a road or rail track passes, etc.

Examples of the selection of network objects satisfying a temporal criterion include selecting all RNCs for which the call drop rate is greater than 2% between 12h00 and 14h00 or greater than 1% on Saturdays or public holidays.

At least one criterion of inclusion to an object zone having been defined, as just explained by means of diverse examples, an object zone may be constructed. In other words, the network objects satisfying said at least one criterion are selected to constitute an object zone. This selection may be effected by any means, for example manually or automatically, and those means do not need to be described here in detail. An object zone may further be constructed dynamically, as the contribution of the objects to the construction of the object zone may vary in time; this allows for including objects that satisfy said at least one criterion for the first time and excluding objects that no longer satisfy that criterion.

An object zone may be used in any network operation or optimization function. Furthermore, different types of use may be distinguished, for example:

use as a list of objects; in this case the object zone lists all the network objects that satisfy said at least one criterion; for example, a list drawn up in this way may be displayed for direct use by the user or used in any optimization function, for example to establish a quality of service report, a diagnosis of network problems, etc., use as a single object; in this case, the object zone is seen as the result of consolidating or aggregating all the objects satisfying said at least one criterion at a given date, or as a result of consolidation or aggregation in a manner evolving over time because the list of the objects satisfying said criterion may vary over time. As the objects of the same object zone may be of the same type or of different types, quality of the service indicators may be consolidated at a common level corresponding to a common type of object or at different levels corresponding to different types of network object. For example, it may be beneficial to consider end to end quality of service by taking into account all object types involved in end to end transmission (for example BSS, NSS and associated transmission links).

Furthermore, it is possible to distinguish between different network optimization functions in which object zones may be used, for example:

radio parameter setting optimization functions: optimum values for this kind of parameter setting (also known as "tuning") may then be applied to all the objects of an object zone in a single operation, quality of service tracking or analysis functions: the operator can track the overall quality of service for all the objects of an object zone (seen as a single object); for example, it can compare the quality of service for two different object zones or study the evolution over time of the quality of service for the same object zone, cartographic analysis functions: for example, the operator can display on a map all the objects of an object zone and carry out cartographic analyses either on the objects of a single zone or on the objects of different zones, etc.

Thus the invention may be used in particular to manage/optimize/study the network at a macroscopic level, thereby simplifying and/or facilitating the task of the operator, in particular in the case of traffic growth, network expansion, introduction of new technologies and/or new functions, etc. For example, the present invention may be used to study quality of service at different levels of the network, for example the BSS, RNS, NSS, etc. levels, and is therefore important in particular in the case of a network using different radio access technologies (for example UMTS, GSM, GPRS, EDGE, etc.), in which the variety and complexity of the objects make the optimization tasks extremely complex.

As indicated above, the present invention is applicable to all types of network objects that may be manipulated or managed in the context of operations to optimize the radio network, whether they be logical objects (for example cells, radio or landline links, etc.) or physical objects (for example network elements, sets of network elements, etc.).

Another aspect of the invention, wherein the network objects correspond to links or relations of adjacency or handover between cells, is described next. The concept of links or relations of adjacency or handover between cells is related to the handover (intercellular transfer) concept. The main object is to prevent a call from being cut off when a mobile station changes cell. The handover concept is therefore closely linked to the movements of the users in the network. Handover is generally effected from a cell called the serving cell to another cell called the target cell. A given cell of the network therefore has at least one server cell and one target cell that are linked, respectively defining adjacency or incoming or outgoing handover links, incoming handover being effected from the serving cell to the given cell and outgoing handover being effected from the given cell to the target cell. In particular, an adjacency or handover link may be defined between cells if one of the cells is in a list of adjacent cells drawn up for another of the cells, this kind of list of adjacent cells being drawn up for the requirements of handover procedures, as indicated above. An object zone corresponds to a set of adjacency links between cells which satisfy a given criterion of inclusion to that set, an object zone of this kind being also called an adjacency zone.

At present, radio network optimization techniques enable the operator to carry out optimization operations such as creating, deleting, modifying or tracking quality of service over adjacency links between cells only at an individual level, and not to carry out optimization operations at a global level, such as in particular to study at a global level the declared relationships of adjacency between cells and the associated quality of service, in particular using quality of service indicators consolidated at the level of an adjacency area.

Examples of these quality of service indicators that can be consolidated in an adjacency zone include the number of changes of cell observed from a given cell to an adjacent cell, etc.

On the basis of these quality of service indicators consolidated at the level of the adjacency zones, the operator can better analyze and comprehend the movements of the users of his network.

In other words, one aspect of the present invention enables the operator:

to define at least one type of movement of users of his network, i.e. to choose a criterion or criteria for grouping links or relationships of adjacency in a common group, also known as an adjacency zone (examples of criteria and movement types are given hereinafter), to study at least one type of movement, for example by means of quality of service indicators such as the standard quality of service indicators usually employed. These quality of service indicators are usually employed to track or analyze the quality of service at the level of an adjacency link considered individually. On the other hand, according to the present invention, they are consolidated at the level of an adjacency zone to track or analyze the quality of service at the level of that adjacency zone.

Accordingly, by adding to the existing analysis and investigation means, the present invention provides the operator with a new function for determining the quality of service in the network. The present invention also enables the operator better to understand the movements or movement trends in certain zones and assists with deducing any problems with the network ratings in the zones concerned, for example.

The operator can study different types of movements of users of his network, for example, which may be associated with different types of adjacency zones, for example:

movements defined considering a given traffic type, for example observed movements from a major road to an activity area corresponding to a business area, for example, defined movements from one type of object toward another type of object, for example movements from macrocells toward indoor cells or, in a multitechnology context, movements from GSM cells toward UMTS cells, for example, or vice versa, defined movements from one geographical area toward another, for example movements from an area A (defined by geographical criteria) toward an area B (defined by geographical criteria), etc.

In other words, in these examples, said criteria of inclusion in an adjacency zone corresponds to a criterion verified by the cells involved in links of adjacency between cells, for example:

a geomarketing criterion,
a criterion based on cell characteristics,
a geographical criterion, etc.

For example, for a type of movement defined considering a given type of traffic, the aim may be better to estimate and understand the habits of the users of the network, to detect any special defects of the areas studied, and to adapt the rating of the network accordingly, if necessary.

For example, for a defined type of movement from one type of network object toward another type of network object, the aim may be to enable quality of service analyses and possibly optimization using appropriate parameters, etc., as the type of movement is then more formalized than in the preceding situation (where it was primarily the habits of users that were involved) and thus better optimization means are available.

Thus, an associated movement type may be selected that is defined on the basis of one or more criteria, i.e. on the basis of the corresponding serving and target cells (and consequently of the links or relations of adjacency). Groups of links of adjacency or "movement zones" may be created and consolidations may be effected to work at this new level with the existing quality of service system (the usual quality of service indicators, quality of service reports, diagnostics, etc.).

The present invention also offers the facility to study movements in a given area, for example to find out if the movements in that area correspond to a type of movement such as, for example, a type of movement defined considering a given type of traffic, or more generally to study the distribution of movements considering all kind of movements observed in the area concerned.

Note an additional benefit of this approach of analysis according to the type of movement, namely complementing the usual approach of analysis in accordance with the traffic. For example, in a zone such as a commercial center, there may be a low level of handover, accompanied by a high level of traffic.

FIGS. 4 and 5 show examples of the results of analyzing the quality of service associated with different types of movement.

FIG. 4 shows, for different types of movements, the number N of handovers (cell changes) as a function of the time of day H on the working days of the week. For example, the following different types of movement are considered:

movements of type 1, corresponding to observed movements from a main road to a business area,
movements of type 2, corresponding to observed movements from one main road to another,
movements of type 3, corresponding to observed movements within a town, and
movements of type 4, corresponding to observed movements from any point to a commercial center.

FIG. 5 shows, for movements of type 1, for example, the number N of handovers (cell changes) as a function of the time of day H on non-working days (for example Saturdays). The number of cell changes is shown by the dashed line curve and the observed traffic T (in Erlangs) is shown by the solid line curve.

Other examples of criteria for forming object zones (in particular adjacency zones) and/or other embodiments of network optimization operations using such object zones (in particular such adjacency zones) are feasible, of course, and it will be clear that it is not possible to provide an exhaustive list of them here.

Moreover, apart from the method explained above by means of diverse examples, another aspect of the present invention is a mobile communication network operating system generally comprising:

means for defining at least one criterion of inclusion of network objects in at least one group of network objects, said group being also referred to as an object zone,
means for constructing at least one object zone from network objects satisfying said at least one criterion, and
means for performing at least one radio network optimization operation using said at least one object zone constructed in this way.

Another aspect of the invention is a workstation for operating a mobile communication network, said workstation generally comprising means (for example man-machine interface means) enabling the user to define at least one criterion of inclusion of network objects in at least one group of network objects, said group also being referred to as an object zone.

For example, in the case of a workstation using a graphical user interface (GUI) employing means for dialog with the user (for example menus, windows associated with different contexts, etc.), a specific menu may be used to offer the user the facility to define object zones. For example, that menu may command the display of a window offering the user the facility to define a criterion or a combination of criteria. The operator can also add a list of objects to a set of objects (constructed automatically) satisfying the selected criterion or criteria. It is also possible to define only a list of objects (and not to define one or more associated criteria).

Another aspect of the present invention is a workstation for operating a mobile communication network, said station generally comprising means (in particular man-machine interface means) enabling the user to perform at least one radio network optimization operation using a group of network objects satisfying at least one criterion of inclusion of network objects in at least one group of network objects, said group also being referred to as an object zone.

The particular implementation of such means representing no particular difficulty for the person skilled in the art, such means do not need to be described in more detail here than by stating their function, as above.

The invention claimed is:

1. A method of operating a mobile communication network, said method comprising:
defining at least one criterion of inclusion of network objects in at least one group of network objects, said group also being referred to as an object zone;
constructing, by a processor, at least one object zone from a first network object of a first type and a second network object of a second type, said first network object and said second network object satisfying said at least one criterion, wherein said first type and said second type are different; and
performing at least one radio network optimization operation using said at least one object zone constructed in this way, said at least one radio network optimization operation including quality of service tracking or analysis,
wherein said at least one radio network optimization operation comprises using as a single object an object zone seen as a result of consolidating all the objects satisfying said at least one criterion, said consolidating comprising consolidating a first quality of service indicator of said first network object and a second quality of service indicator of said second network object at an object zone level.

2. The method according to claim 1, wherein said criterion of inclusion is such that all the objects of the same object zone are objects of different types.

3. The method according to claim 1, wherein one object type is a cell.

4. The method according to claim 1, wherein one object type is a network element.

5. The method according to claim 1, wherein one object type is a set of network elements.

6. The method according to claim 1, wherein one object type is a relation of adjacency between cells.

7. The method according to claim 1, wherein said construction step is effected dynamically.

8. The method according to claim 1, wherein said consolidation comprises a consolidation of counters and/or indicators defined at object zone level.

9. An operating system for a mobile communication network, said system comprising:
   means for defining at least one criterion of inclusion of network objects in at least one group of network objects, said group also being referred to as an object zone,
   means for constructing at least one object zone from a first network object of a first type and a second network object of a second type, said first network object and said second network object satisfying said at least one criterion, wherein said first type and said second type are different, and
   means for performing at least one radio network optimization operation using said at least one object zone constructed in this way, said at least one radio network optimization operation including quality of service tracking or analysis,
   wherein said at least one radio network optimization operation comprises using as a single object an object zone seen as a result of consolidating all the objects satisfying said at least one criterion, said consolidating comprising consolidating a first quality of service indicator of said first network object and a second quality of service indicator of said second network object at an object zone level.

10. The system according to claim 9, wherein said consolidation comprises a consolidation of counters and/or indicators defined at object zone level.

11. A workstation for operating a mobile communication network, said workstation comprising:
   means for enabling a user to define at least one criterion of inclusion of network objects in at least one group of network objects, said group being also referred to as an object zone and for performing at least one radio network optimization operation using said at least one object zone, said radio network optimization operation including quality of service tracking or analysis,
   wherein said at least one radio network optimization operation comprises using as a single object an object zone seen as a result of consolidating a first network object of a first type and a second network object of a second type satisfying said at least one criterion, wherein said first type and said second type are different, said consolidating comprising consolidating a first quality of service indicator of said first network object and a second quality of service indicator of said second network object at an object zone level.

12. The workstation according to claim 11, wherein said consolidation comprises a consolidation of counters and/or indicators defined at object zone level.

13. A workstation for operating a mobile communication network, said workstation comprising:
   means for enabling a user to perform at least one radio network optimization operation using a group of network objects satisfying at least one criterion of inclusion of network objects in at least one group of network objects, said group also being referred to as an object zone and said at least one radio network optimization operation including quality of service tracking or analysis,
   wherein said at least one radio network optimization operation comprises using as a single object an object zone seen as a result of consolidating a first network object of a first type and a second network object of a second type satisfying said at least one criterion, wherein said first type and said second type are different, said consolidating comprising consolidating a first quality of service indicator of said first network object and a second quality of service indicator of said second network object at an object zone level.

14. The workstation according to claim 13, wherein said consolidation comprises a consolidation of counters and/or indicators defined at object zone level.

* * * * *